Patented July 25, 1967

3,332,936
BIS(PHENYLSULFONYL)DIAZOMETHANES AND THEIR PREPARATION
Jurgen Diekmann, Chadds Ford, Pa., assignor to E. I. du Pont de Nemours and Company, Wilmington, Del., a corporation of Delaware
No Drawing. Filed Sept. 28, 1962, Ser. No. 227,063
15 Claims. (Cl. 260—239)

This invention relates to, and has as its principal objects provision of, novel and useful compounds and the preparation of the same.

Ordinary diazo compounds are very unstable and therefore hazardous for use in many applications. The present invention provides a new class of diazo compounds that are extremely stable. These novel products are bis(sulfonyl)diazomethanes of the general formula $(RSO_2)_2CN_2$ and the hybrid resonance forms:

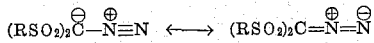

In these formulae, R is alkyl, aryl ("aryl" here means an unsubstituted aromatic monovalent hydrocarbon radical), alkaryl, aralkyl, haloalkyl, haloaryl, cyanoalkyl, cyanoaryl, hydroxyalkyl, alkoxyalkyl, alkoxyaryl, carboxyalkyl, carbalkoxyalkyl, aryloxyalkyl, aminoaryl, amidoaryl, nitroaryl, arylsulfonylaryl (aryl-$SO_2$-aryl-), or a heterocyclic group that is aromatic in character, e.g., furyl, thienyl or pyrrolyl. A preferred group of products is that in which the R groups individually have up to 19 carbon atoms.

The bis(sulfonyl)diazomethanes are prepared by the reaction of a carbonyl halide azine, preferably carbonyl bromide azine, $Br_2C=N-N=CBr_2$, with a sulfinic acid salt of the formula $(RSO_2)_aM$ wherein R has the meaning assigned above, M is an alkali or alkaline earth metal, and $a$ is the valence of M, i.e., 1 or 2, under anhydrous conditions in the presence of an inert organic reaction medium. Carbonyl bromide azine, here used as a starting material, can be prepared from the commercially available 5-aminotetrazole by the method of J. Thiele, Ann., 303, 57 (1898). The sulfinic acids and their salts are known compounds. The inert organic reaction medium is preferably a polar solvent. Suitable polar solvents include acetonitrile, dimethylformamide and tetramethylene sulfoxide.

The course of the reatcion is illustrated by the following equation:

(1)
$$5\, RSO_2Na + Br_2C=N-N=CBr_2 \longrightarrow$$
$$(RSO_2)_2CN_2 + NaC(SO_2R)_3 + 4NaBr$$

In this reaction, the formation of some bis(sulfonyl)diazomethane will take place with any proportions of sulfinic acid salt and carbonyl halide azine. Best yields of the bis(sulfonyl)diazomethane are obtained, however, when five equivalents of the sulfinic acid salt are used for each mole of carbonyl halide azine. An excess of sulfinic acid salt over the five equivalents can be used if desired.

As indicated above, the reaction medium and the reactants must be anhydrous since any water present causes the reaction to take a different course as described more fully below.

The reaction takes place readily at temperatures ranging from about $-20°$ C. up to room temperature, i.e., 20–30° C. Preferably the anhydrous reactants are mixed together slowly at a temperature of about $-15°$ C. and after about one hour the reaction mixture is stirred at room temperature for several hours, e.g., two hours or more. The reaction mixture is then filtered to remove insoluble salts and the solvent of the mother liquor is removed in vacuo. The oily residue is then dissolved in benzene and the solution is passed through a chromatography column packed with acid-washed alumina. The column is then eluted with benzene, and the first yellow fraction obtained in the eluate is collected. Removal of the benzene from this fraction gives the bis(sulfonyl)diazomethane.

An alternative method for the preparation of the bis(sulfonyl)diazomethane of this invention involves the use of reactants or reaction media that contain moisture. In this alternate process, four equivalents of the sulfinic acid salt are added to a solution of one mole of the carbonyl halide azine in an inert organic solvent, preferably a polar solvent, e.g., dimethylformamide, at room temperature (20–30° C.) or lower to form an intermediate compound of the formula $(RSO_2)_2C=N-N=C(SO_2R)_2$. This intermediate is in turn hydrolyzed with water to a bis(sulfonyl)formaldehyde hydrazone, $$(RSO_2)_2C=NNH_2,$$

which is then oxidized, e.g., by means of active manganese dioxide, in an inert reaction medium, e.g., tetrahydrofuran, at ordinary temperature to the desired bis(sulfonyl)diazomethane. Equations representing these reactions may be written as follows (R being as above):

(2)
$$4\, RSO_2Na + Br_2C=N-N=CBr_2 \xrightarrow[\text{Formamide}]{\text{Dimethyl}}$$
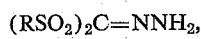
$$(RSO_2)_2C=N-N=C(SO_2R)_2$$

(3)
$$(RSO_2)_2C=N-N=C(SO_2R)_2 + H_2O \longrightarrow (RSO_2)_2C=NNH_2$$

(4)
$$(RSO_2)_2C=NNH_2 \xrightarrow[MnO_2]{\text{active}} (RSO_2)_2CN_2$$

In the first step of it this alternative process (Equation 2), reaction between the carbonyl bromide azine and the sulfinic acid salt takes place rapidly in an inert reaction medium and in the presence of a hydrogen bromide acceptor, e.g., a weak base such as a carbonate. Preferably, the stoichiometric proportions of one mole of the carbonyl bromide azine with four equivalents of the sulfinic acid salt are employed; however, an excess of either reactant can be used if desired. Any inert organic solvent can be used as reaction medium, but it is preferable to use a polar solvent such as acetonitrile, tetramethylene sulfoxide or dimethylformamide. The reaction should be carried out at a temperature below that at which the sulfinate disproportionates. Although reaction temperatures below room temperature (20–30° C.) are generally operable, it is preferable to carry out the reaction at a temperature of about $-10°$ to $-15°$ C. Reaction takes place rapidly at these temperatures, i.e., reaction is completed in a few minutes, e.g., 15–30 min. to a few hours, e.g., 2–4 hrs. The sulfinic acid or sulfinic acid salt is preferably added to the carbonyl bromide azine solution gradually so as to avoid local overheating of the reaction mixture by the exothermic reaction that takes place.

After reaction of the azine and the sulfinate is completed, a large excess of water is added (Equation 3) to hydrolyze the intermediate $$(RSO_2)_2C=N-N=C(SO_2R)_2$$

to the bis(sulfonyl)formaldehyde hydrazone, $$(RSO_2)_2C=NNH_2$$

and precipitate this product from the reaction mixture. The solid product is then isolated by filtration. It can be washed with water or recrystallized from an inert solvent, e.g., acetonitrile, if desired.

In the final step of the alternative process (Equation 4), the bis(sulfonyl)formaldehyde hydrazone is dissolved in an inert solvent, e.g., tetrahydrofuran or methylene chloride, and treated with an oxidizing agent. A wide variety of oxidizing agents can be used, e.g., active manganese dioxide, silver oxide, mercuric oxide, and calcium hypochlorite. The oxidation takes place at ordinary temperature. While silver oxide is a good oxidizing agent for the hydrazone, the product develops a red color when this oxide is used. Active manganese dioxide is a very effective oxidizing agent and it does not cause discoloration of the product. The proportions of oxidizing agent used are not critical; however, an amount sufficient to completely oxidize the hydrazone to the diazo compound should be used in order to obtain the maximum yield of the desired product. The oxidation is conveniently carried out at room temperature; however lower or higher temperatures can be used if desired. The oxidation is usually complete in 1 to 2 hours at room temperature. The resulting bis(sulfonyl)diazomethane is isolated from the reaction mixture by conventional methods. When a metal oxide is used as the oxidizing agent, this can be filtered from the reaction mixture at the end of the reaction and the solvent then removed from the filtrate by distillation or evaporation. The residual bis(sulfonyl)diazomethane can then be recrystallized, e.g., from a benzenecyclohexane mixture, if desired.

The alternative process of this invention has been described as one in which the intermediate bis(sulfonyl) formaldehyde hydrazone is isolated and subsequently oxidized. It is not strictly necessary to isolate the hydrazone but, if it is not isolated, more by-products are formed and the desired bis(sulfonyl)diazomethane is difficult to recover.

In addition to the bis(sulfonyl)diazomethanes produced in the process of this invention, there are also obtained as by-products bis(sulfonyl)methanes.

The products and process of this invention are illustrated in further detail in the following examples in which the proportions of ingredients are expressed in parts by weight unless otherwise specified.

Example I

To a solution of 3.72 g. of carbonyl bromide azine in 10 ml. of dimethylformamide is added 6.56 g. of anhydrous sodium benzenesulfinate. The mixture is cooled by an ice-acetone bath. Stirring is continued for 30 minutes. A large excess of water is then added and the reaction mixture is stirred for another hour. The resulting solid precipitate is filtered out and washed several times with water. There is obtained 3 g. of crude, off-white bis(phenylsulfonyl)formaldehyde hydrazone. On recrystalization from acetonitrile white cubes of the hydrazone are obtained having a decomposition point of 170–20° C.

Analysis.—Calcd. for $C_{13}H_{12}N_2O_4S_2$: C, 48.14%; H, 3.73%; N, 8.64%; S, 19.77%. Found: C, 48.39%; H, 3.86%; N, 8.87%; S, 20.07%.

The infrared absorption spectrum obtained on this product is consistent with the hydrazone structure.

To a mixture of 1 g. of bis(phenylsulfonyl)formaldehyde hydrazone and 100 ml. of chloroform is added 2 g. of active manganese dioxide. The suspension is stirred at room temperature for 1 hour, filtered free of manganese dioxide, and the solvent is removed from the filtrate by subjecting the mother liquor to an aspirator vacuum of about 20 mm. Hg. The residual yellow oil solidifies on rubbing with cyclohexane. The product is recrystallized from a benzene-cyclohexane mixture (approximately 1:1) to give yellow rods of bis(phenylsulfonyl)diazomethane, decomposition point 85° C. The infrared absorption spectrum shows a very strong band at 2100 cm.$^{-1}$ which is characteristic of diazo compounds. A weak absorption band at 380 millimicrons is observed in the ultraviolet absorption spectrum.

Analysis.—Calcd. for $C_{13}H_{10}N_2O_4S_2$: C, 48.44%; H, 3.12%. Found: C, 48.71%; H, 3.59%.

Example II

Following the procedure of Example I there is obtained from 3.72 g. of carbonyl bromide azine and 7.12 g. of sodium p-toluenesulfinate, 3.2 g. of bis(p-tolylsulfonyl) formaldehyde hydrazone, decomposition point 190° C.

Analysis.—Calcd. for $C_{15}H_{16}N_2O_4S_2$: C, 51.11%; H, 4.58%; N, 7.95%; S, 18.20%. Found: C, 50.56%; H, 4.31%; N, 8.17%; S, 18.20%.

Following the procedure in the second part of Example I there is obtained from 0.5 g. of bis(p-tolylsulfonyl) formaldehyde hydrazone in 100 ml. of tetrahydrofuran and 1 g. of active manganese dioxide, 0.4 g. of bis(p-tolylsulfonyl)diazomethane, dec. pt. 95–100° C. This product has an infrared absorption band at 2100 cm.$^{-1}$.

Example III

To a solution of 3.72 g. of carbonyl bromide azine in 50 ml. of dimethylformamide cooled to 5–10° C. is added 8.25 g. of sodium p-isopropylbenzenesulfinate. After stirring for 2 hours, water is added and the organic portion is extracted with methylene chloride. To the resulting organic solution is added 5 g. of active manganese dioxide. The reaction mixture is stirred for 2 hours, then filtered free of manganese dioxide, and the solvent of the filtrate is removed in vacuo (about 20 mm. at room temperature). About 3 g. of yellow, oily product, identified by its characteristic infrared absorption at 2100 cm.$^{-1}$ as bis(p-isopropylphenylsulfonyl)diazomethane, is obtained.

Example IV

Following the procedure of Example III there is obtained from 3.72 g. of carbonyl bromide azine and 4.8 g. of potassium methanesulfinate in 50 ml. of dimethylformamide and subsequent treatment of the methylene chloride solution with 6 g. of active manganese dioxide, about 2 g. of oily product, identified by its infrared absorption band near 2100 cm.$^{-1}$ as bis(methylsulfonyl)diazomethane.

Example V

Following the procedure of Example I there is obtained from 11.2 g. of carbonyl bromide azine, 28 g. of p-acetamidobenzenesulfinic acid, and 7.4 g. of sodium carbonate in 150 ml. of dimethylformamide, 9.8 g. of bis(p-acetamidophenylsulfonyl)formaldehyde hydrazone having a decomposition point of 228° C.

Analysis.—Calcd. for $C_{17}H_{18}N_4O_6S_2$: C, 46.56%; H, 4.14%; N, 12.77%; S, 14.63%. Found: C, 46.34%; H, 4.00%; N, 13.32%; S, 15.05%.

On oxidation of this hydrazone by means of manganese dioxide in the manner described in Example I, there is obtained bis(p-acetamidophenylsulfonyl)diazomethane identified by the infrared absorption band at 2100 cm.$^{-1}$.

Example VI

There is obtained from 7 g. of carbonyl bromide azine, 20 g. of p-nitrobenzenesulfinic acid and 4.2 g. of sodium carbonate in 100 ml. of dimethylformamide by the procedure of Example I, 5.8 g. of bis(p-nitrophenylsulfonyl)-formaldehyde hydrazone having a decomposition point of 205–209° C.

Analysis.—Calcd. for $C_{13}H_{10}N_4O_8S_2$: C, 37.68%; H, 2.43%; N, 13.52%; S, 15.48%. Found: C, 36.81%; H, 2.37%; N, 13.85%; S, 15.12%.

Oxidation of this hydrazone with active manganese dioxide in the manner described in Example I gives bis(p-nitrophenylsulfonyl)diazomethane, which is identified by its infrared absorption spectrum at 2100 cm.$^{-1}$.

Example VII

Similarly, following the procedure given in Example I, there is obtained from 7 g. of carbonyl bromide azine, 22 g. of 2,5-dichlorobenzenesulfinic acid and 4.2 g. of sodium carbonate, 5.4 g. of bis(2,5-dichlorophenylsulfonyl)formaldehyde hydrazone, having a decomposition point of 195° C. Oxidation of this hydrazone by means of manganese dioxide in accordance with the procedure described in Example I gives bis(2,5-dichlorophenylsulfonyl)diazomethane which is identified my its infrared absorption band at 2100 cm.$^{-1}$.

Example VIII

To a solution of 3.72 g. (0.01 mole) of carbonyl bromide azine in 75 ml. of anhydrous acetonitrile is added with stirring 8.55 g. (0.05 mole) of anhydrous sodium benzenesulfinate with cooling provided by an ice-acetone bath (about −15° C.). After one hour, the cooling bath is removed and the mixture is stirred for two hours at room temperature. The mixture is then filtered free of salts and the solvent of the mother liquor is removed in vacuo. The oily residue is taken up in benzene and passed through a column of acid-washed alumina. Benzene is then passed through the column. The first yellow fraction of the eluate contains the product and is collected. Removal of the benzene yields 3.0 g. of bis(phenylsulfonyl)-diazomethane. The infrared absorption spectrum exhibited by this product is identical with that for the product of Example I.

The examples have illustrated this invention by reference to the preparation of specific bis(sulfonyl)diazomethanes. However, the products of this invention include any diazomethanes of the formula $(RSO_2)_2CN_2$ wherein the R's are hydrocarbon or substituted hydrocarbon radicals. Other specific bis(sulfonyl)diazomethanes included in this invention are listed in the following table together with the specific sulfinic acids from which they can be prepared by procedures described in the examples.

| Sulfinic Acid Reactant | Bis(sulfonyl)diazomethane |
| --- | --- |
| o-Toluenesulfinic acid | Bis(o-tolylsulfonyl)diazomethane. |
| α-Naphthalenesulfinic acid | Bis(α-naphthylsulfonyl)diazomethane. |
| β-Naphthalenesulfinic acid | Bis(β-naphthylsulfonyl)diazomethane. |
| n-Butanesulfinic acid | Bis(n-butylsulfonyl)diazomethane. |
| Phenylmethanesulfinic acid | Bis(benzylsulfonyl)diazomethane. |
| p-Bromobenzenesulfinic acid | Bis(p-bromophenylsulfonyl)diazomethane. |
| p-Fluorobenzenesulfinic acid | Bis(p-fluorophenylsulfonyl)diazomethane. |
| p-Iodobenzenesulfinic acid | Bis(p-iodophenylsulfonyl)diazomethane. |
| Dodecanesulfinic acid | Bis(dodecylsulfonyl)diazomethane. |
| Octadecanesulfinic acid | Bis(octadecylsulfonyl)diazomethane. |
| m-Cyanobenzenesulfinic acid | Bis(m-cyanophenylsulfonyl)diazomethane. |
| 2-dibenzofuranesulfinic acid | Bis(2-dibenzofurylsulfonyl)diazomethane. |
| β-Chloroethanesulfinic acid | Bis(β-chloroethylsulfonyl)diazomethane. |
| β-Cyanoethanesulfinic acid | Bis(β-cyanoethylsulfonyl)diazomethane. |
| β-Hydroxyethanesulfinic acid | Bis(β-hydroxyethylsulfonyl)diazomethane. |
| β-Methoxyethanesulfinic acid | Bis(β-methoxyethylsulfonyl)diazomethane. |
| β-(β-Hydroxyethylsulfonyl)-ethanesulfinic acid | Bis[β-(β-hydroxyethylsulfonyl)ethylsulfonyl]diazomethane. |
| o-Carboxybenzenesulfinic acid | Bis(o-carboxyphenylsulfonyl)diazomethane. |
| o-Methoxycarbonylbenzenesulfinic acid | Bis(o-methoxycarbonylphenylsulfonyl)diazomethane. |
| 5-chloro-2-cyano-3-methyl benzenesulfinic acid | Bis(5-chloro-2-cyano-3-methylphenylsulfonyl)diazomethane. |
| 2-cyano-5-methylbenzenesulfinic acid | Bis(2-cyano-5-methylphenylsulfonyl)diazomethane. |
| 1-cyano-2-naphthalenesulfinic acid | Bis(1-cyano-2-naphthylsulfonyl)diazomethane. |
| Ethoxycarbonylmethanesulfinic acid | Bis(ethoxycarbonylmethylsulfonyl)diazomethane. |
| 5-methoxycarbonylpentanesulfinic acid | Bis(5-methoxycarbonylpentylsulfonyl)diazomethane. |
| p-Phenylsulfonylbenzenesulfinic acid | Bis(p-phenylsulfonylphenylsulfonyl)diazomethane. |
| β-Phenoxyethanesulfinic acid | Bis(β-phenoxyethylsulfonyl)diazomethane. |
| p-Phenoxybenzenesulfinic acid | Bis(p-phenoxyphenylsulfonyl)diazomethane. |
| Dichloromethanesulfinic acid | Bis(dichloromethylsulfonyl)diazomethane. |
| Trichloromethanesulfinic acid | Bis(trichloromethylsulfonyl)diazomethane. |
| 1,7,7-trimethylbicyclo-(2.2.1)-heptane-2-sulfinic acid | Bis[1,7,7-trimethylbicyclo-(2.2.1)-hept-2-ylsulfonyl]-diazomethane. |
| 4-methyl-2,6-dinitrobenzenesulfinic acid | Bis(4-methyl-2,6-dinitrophenylsulfonyl)diazomethane. |
| 2-methyl-5-isopropylbenzenesulfinic acid | Bis(2-methyl-5-isopropylphenylsulfonyl)diazomethane. |
| 5,6,7,8-tetrahydro-1-naphthalenesulfinic acid | Bis(5,6,7,8-tetrahydro-1-napthalsulfonyl)diazomethane. |
| 4-chloro-1-napthalenesulfinic acid | Bis(4-chloro-1-naphthylsulfonyl)diazomethane. |
| 8-nitro-1-naphthalenesulfinic acid | Bis(8-nitro-1-naphthylsulfonyl)diazomethane. |
| 2-anthracenesulfinic acid | Bis(2-anthrylsulfonyl)diazomethane. |
| o-Ethoxybenzenesulfinic acid | Bis(o-ethoxyphenylsulfonyl)diazomethane. |
| 4-bromo-3-carboxybenzenesulfinic acid | Bis(4-bromo-3-carboxyphenylsulfonyl)diazomethane. |
| 4-chloro-2-nitrobenzenesulfinic acid | Bis(4-chloro-2-nitrophenylsulfonyl)diazomethane. |
| Triphenylmethanesulfinic acid | Bis(triphenylmethylsulfonyl)diazomethane. |
| 6-hydroxy-2-naphthalenesulfinic acid | Bis(6-hydroxy-2-naphthylsulfonyl)diazomethane. |
| 2-anthraquinonesulfinic acid | Bis(2-anthraquinonylsulfonyl)diazomethane. |
| 4-hydroxy-1-anthraquinonesulfinic acid | Bis(4-hydroxy-1-anthraquinonylsulfonyl)diazomethane. |
| 2-ethoxy-4,5-dimethoxybenzenesulfinic acid | Bis(2-ethoxy-4,5-dimethoxyphenylsulfonyl)diazomethane. |
| 3-carboxy-4-hydroxybenzenesulfinic acid | Bis(3-carboxy-4-hydroxyphenylsulfonyl)diazomethane. |
| 2-furanesulfinic acid | Bis(2-furylsulfonyl)diazomethane. |
| 2-thiophenesulfinic acid | Bis(2-thienylsulfonyl)diazomethane. |
| 2-pyrrolesulfinic acid | Bis(2-pyrrylsulfonyl)diazomethane. |
| o-Aminobenzenesulfinic acid | Bis(o-aminophenylsulfonyl)diazomethane. |
| p-Dimethylaminobenzenesulfinic acid | Bis(p-dimethylaminophenylsulfonyl)diazomethane. |
| Iodomethanesulfinic acid | Bis(iodomethylsulfonyl)diazomethane. |
| Trifluoromethanesulfinic acid | Bis(trifluoromethylsulfonyl)diazomethane. |
| Perfluoroisopropanesulfinic acid | Bis(perfluoroisopropylsulfonyl)diazomethane. |

The bis(sulfonyl)diazomethanes of this invention are useful for various purposes. In particular, they are useful as photopolymerization initiators. The following example illustrates the use of bis(phenylsulfonyl)diazomethane as a photoinitiator for the polymerization of methyl acrylate.

Example A

A solution of 0.15 g. of bis(phenylsulfonyl)diazomethane in 5 ml. of methyl acrylate maintained at room temperature by means of a water bath is irradiated with a 1000-watt high pressure mercury vapor lamp. After about 2 hours the solution is polymerized to hard polymer with nitrogen bubbles trapped in it. Methyl acrylate containing no initiator irradiated under the same conditions is not polymerized.

The ability of the bis(sulfonyl)diazomethanes of this invention to liberate nitrogen during photopolymerization makes them also useful blowing agents as well as polymerization initiators.

In addition to being intermediates in the synthesis of bis(sulfonyl)diazomethanes, the bis(phenylsulfonyl)-formaldehyde hydrazones are useful as blowing agents since they decompose at temperatures of 180° C. and above with the liberation of nitrogen. More specifically, they can be incorporated into various plastics and rubbers and the resulting compositions can be heated to produce foamed plastics and sponge rubbers of various types.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula $(RSO_2)_2CN_2$ wherein R is selected from the group consisting of alkyl, aryl, alkaryl, aralkyl, haloalkyl, haloaryl, cyanoalkyl, cyanoaryl, hydroxyalkyl, alkoxyalkyl, akoxyaryl, carboxyalkyl, carbalkoxyalkyl, aryloxyalkyl, aminoaryl, amidoaryl, nitroaryl, and arylsulfonylaryl of up to 19 carbons, furyl, thienyl and pyrrolyl.
2. Bis(phenylsulfonyl)diazomethane.
3. Bis(p-tolylsulfonyl)diazomethane.
4. Bis(p-isopropylphenylsulfonyl)diazomethane.
5. Bis(methylsulfonyl)diazomethane.
6. Bis(p-acetamidophenylsulfonyl)diazomethane.
7. Bis(p-nitrophenylsulfonyl)diazomethane.
8. Bis(2,5-dichlorophenylsulfonyl)diazomethane.

9. The process of producing a bis(sulfonyl)diazomethane of claim 1 which comprises reacting, under substantially anhydrous conditions at a temperature of between about −20° C. and 30° C. in an inert organic reaction medium, (1) carbonyl bromide azine and (2) a sulfinic acid salt of the formula $(RSO_2)_aM$, wherein: M is selected from the group consisting of alkali and alkaline earth metals; $a$, the valence of M, is an integer of from 1 to 2; and R is selected from the group consisting of alkyl, aryl, alkaryl, aralkyl, haloalkyl, haloaryl, cyanoalkyl, cyanoaryl, hydroxyalkyl, alkoxyalkyl, alkoxyaryl, carboxyalkyl, carbalkoxyalkyl, aryloxyalkyl, aminoaryl, amidoaryl, nitroaryl, and arylsulfonylaryl of up to 19 carbons, furyl, thienyl and pyrrolyl.

10. The process of producing bis(phenylsulfonyl)diazomethane which comprises reacting, under substantially anhydrous conditions at a temperature of between about −20° C. and 30° C. in an inert organic reaction medium, (1) carbonyl bromide azine and (2) sodium benzenesulfinate.

11. In the production of a bis(sulfonyl)diazomethane of claim 1, the step which comprises reacting, at a temperature of between about −20° C. and 30° C. in an inert organic reaction medium, (1) carbonyl bromide azine and (2) a sulfinic acid salt of the formula $(RSO_2)_aM$, wherein: M is selected from the group consisting of alkali and alkaline earth metals; $a$, the valence of M, is an integer of from 1 to 2; and R is selected from the group consisting of alkyl, aryl, alkaryl, aralkyl, haloalkyl, haloaryl, cyanoalkyl, cyanoaryl, hydroxyalkyl, alkoxyalkyl, alkoxyaryl, carboxyalkyl, carbalkoxyalkyl, aryloxyalkyl, aminoaryl, amidoaryl, nitroaryl and arylsulfonanylaryl of up to 19 carbons, furyl, thienyl and pyrrolyl.

12. The process of producing a bis(sulfonyl)diazomethane which comprises (A) reacting, at a temperature of between about −20° C. and 30° C. in an inert organic reaction medium, (1) carbonyl bromide azine and (2) a sulfinic caid salt of the formula $(RSO_2)_aM$, wherein: M is selected from the group consisting of alkali and alkane earth metals; $a$, the valence of M, is an integer of from 1 to 2; and R is selected from the group consisting of alkyl, aryl, alkaryl, aralkyl, haloalkyl, haloaryl, cyanoalkyl, cyanoaryl, hydroxyalkyl, alkoxyalkyl, alkoxyaryl, carboxyalkyl, carbalkoxyalkyl, aryloxyalkyl, aminoaryl, amidoaryl, nitroaryl and arylsulfonylaryl of up to 19 carbons, furyl, thienyl and pyrrolyl, (B) adding water to the resultant reaction mixture and (C) contacting the intermediate product with an inorganic oxidizing agent.

13. The process of claim 12 wherein the inorganic oxidizing agent is manganese dioxide.

14. The process of producing bis(p-isopropylphenylsulfonyl)diazomethane which comprises (A) reacting carbonyl bromide azine with an alkali metal p-isopropylbenzenesulfinate in dimethylformamide, (B) adding water to the resultant reaction mixture and (C) contacting the intermediate product with manganese dioxide.

15. The process of producing bis(methylsulfonyl)diazomethane which comprises (A) reacting carbonyl bromide azine with an alkali metal methanesulfinate in dimethylformamide, (B) adding water to the resultant reaction mixture and (C) contacting the intermediate product with manganese dioxide.

References Cited

UNITED STATES PATENTS

| | | | |
|---|---|---|---|
| 2,710,862 | 6/1955 | Schroeder | 260—239 |
| 2,778,815 | 1/1957 | Ackermann et al. | 260—141 |
| 2,883,423 | 4/1959 | Mosher et al. | 260—566 |
| 2,967,851 | 1/1961 | Roos et al. | 260—239 X |
| 2,996,500 | 8/1961 | Ehrlich | 260—239 |
| 2,999,112 | 9/1961 | Saunders | 260—566 |

OTHER REFERENCES

Becker: Rec. trav. Chem., vol. 70, pp. 733–737 (1951).

Bott: Aciditatsmessungen, March, 1962, title page and pp. 14–19 and 35–38.

Sidgwick: Organic Chemistry of Nitrogen, page 350, 1937.

ALEX MAZEL, *Primary Examiner.*

FLOYD D. HIGEL, RICHARD J. GALLAGHER,
*Asistant Examiners.*